Figure 1:
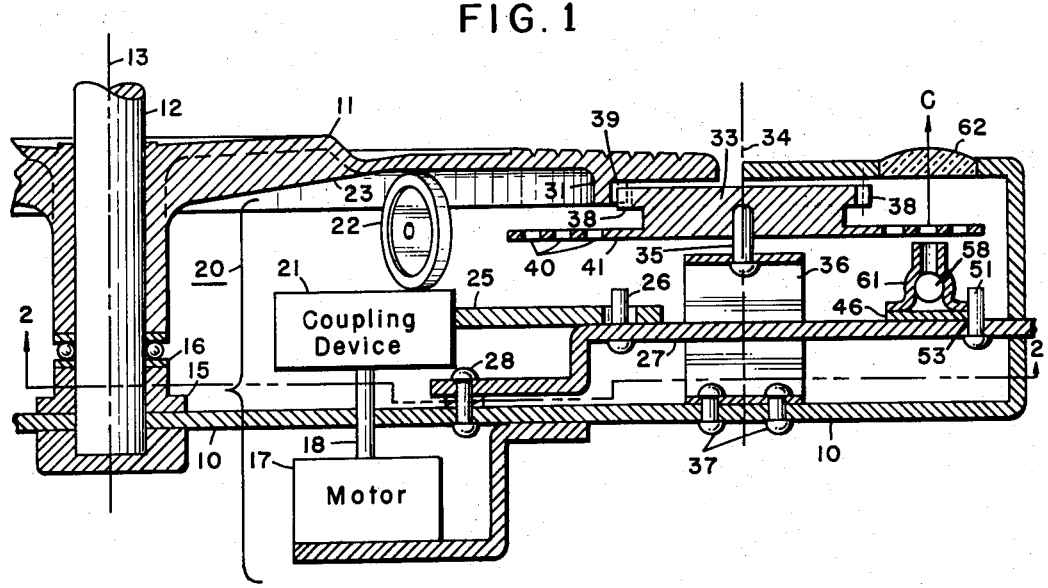

Feb. 28, 1956

M. E. HARDY 2,736,228

PHONOGRAPH SPEED INDICATOR

Filed May 20, 1952

2 Sheets-Sheet 1

INVENTOR:
MAURICE E. HARDY
BY
Francis W. Crotty
HIS ATTORNEY.

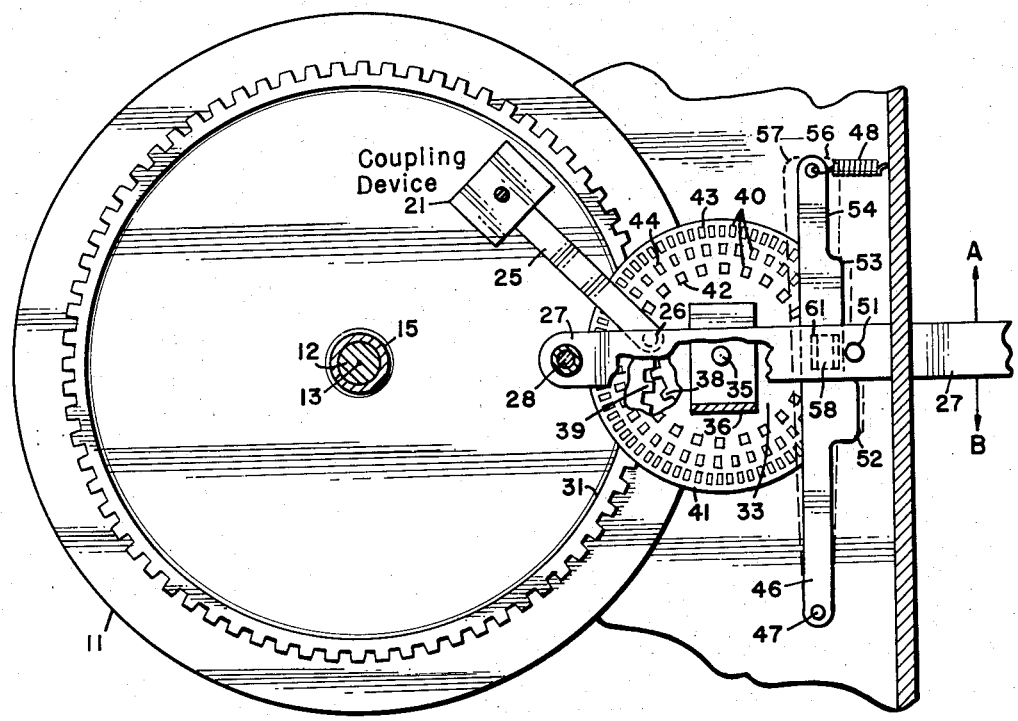

United States Patent Office 2,736,228
Patented Feb. 28, 1956

2,736,228

PHONOGRAPH SPEED INDICATOR

Maurice E. Hardy, Chicago, Ill., assignor to Zenith Radio Corporation, a corporation of Illinois Application May 20, 1952, Serial No. 288,903

3 Claims. (Cl. 88—14)

This invention relates to a novel speed indicator device particularly suited for use in a phonograph.

Multi-speed turntable driving systems in phonograph apparatus intended for use in the home have become increasingly more prevalent due to the current commercial practice of recording music and other program material on record discs to be rotated at 78, 45, or 33⅓ revolutions per minute for proper reproduction. Some of these systems provide three independent driving connections individually operable at an assigned one of the above-mentioned speeds, whereas more acceptable systems permit continuous variation of the phonograph driving speed over a range extending from approximately 10 to 85 revolutions per minute. Many of the systems employing multiple driving connections provide means to effect minor variations in the phonograph speed so that it may be adjusted to the precise rate desired by the operator, whereas this feature is an inherent characteristic of the more desirable continuously variable speed drive.

Just as with any other similar product, phonographs intended for general use in the home are mass produced in accordance with practical standards or tolerances which permit minor variations in the physical dimensions of their component parts. While every effort is made to maintain the maximum of precision in manufacturing these components, it is inevitable that variations occur, and as a result the performance characteristics of individual machines, although produced by identical methods, nevertheless show some specific differences. The customarily acceptable tolerance with respect to the speed of rotation is 3 to 4 percent of the standard rotational speed, but even this relatively small range of divergence may create appreciable distortion in the reproduced sound. It has therefore become highly desirable to provide convenient and inexpensive means for monitoring the speed of the phonograph in relation to the reference speeds. Such a speed indicator is particularly valuable in conjunction with the continuously variable speed drive system, since it provides a practical means for establishing a rotational speed precisely matching any standard angular velocity employed in recording apparatus.

One type of speed indicator ideally suited for precise control of rotational speeds is the familiar stroboscope. Most stroboscopes are constructed as auxiliaries or accessories for the principal apparatus, and are therefore objectionable in connection with appliances utilized in the home, due to the aversion of many people toward rotating machinery. This objection, however, may be obviated if the stroboscopic equipment is included in the phonograph chassis and shielded to prevent interference by careless operators; its value may be further enhanced if no additional controls are required to operate the speed indicator.

It is an object of this invention, therefore, to provide an improved speed indicator device for a phonograph to permit precise adjustment of the rotational speed to correspond to an accepted standard.

It is a further object of this invention to provide, in a phonograph, a stroboscopic speed indicator which is inexpensive to manufacture and simple and expedient to assemble.

It is a corollary object of this invention to provide a speed indicator which is included within a phonograph cabinet and which presents no exposed moving or rotating parts to endanger the operator.

It is an additional object of this invention to provide a phonograph speed indicator which is operable in connection with a standard phonograph speed control mechanism and requires no separate adjusting apparatus.

The speed indicator of the subject invention is applicable to a phonograph comprising a record-supporting turntable of predetermined diameter mounted for rotation about a predetermined axis, a driving system for rotating the turntable, and speed control means for adjusting the rotational speed of the turntable. The speed indicator comprises a speed indicator disc including a plurality of series of elemental substantially light-transparent areas each equally spaced in an annular pattern about the periphery of the disc and each corresponding to a predetermined standard rotational speed. The speed indicator disc is supported for rotational movement about a separate reference axis with a substantial part of the disc extending beyond the turntable and is mechanically coupled to the driving system at all times when the phonograph is in operation so that the disc is rotated about its reference axis with an angular velocity directly proportional to the turntable speed. A source of intermittent light having a fixed frequency substantially equal to an integral multiple of each of the standard rotational speeds is included in the speed indicator; this light source is mounted beneath the disc and projects light through at least a portion of the light-transparent areas in the extended part of this disc for direct view from an observational vantage point.

The features believed to be novel are set forth with particularity in the appended claims and the invention itself, both as to its organization and manner of operation, together with further objects and advantages thereof may best be understood by reference to the following description taken in connection with the accompanying drawings in the several figures of which like reference numerals indicate like elements and in which:

Figure 1 is a sectional side view of a phonograph including a preferred embodiment of the invention, a portion of the phonograph apparatus being shown schematically; and Figure 2 is a view taken along line 2—2 of Figure 1.

The phonograph represented in Figure 1 includes a base 10 employed as a support for the various component parts of the mechanism. A turntable 11 is mounted for rotation about a central spindle 12 having a reference axis 13. Spindle 12 is mounted on base 10 by means of a collar 15, the upper surface 16 of which also serves as a thrust bearing for the support of turntable 11. The spindle and turntable mounting structure constitute no part of the instant invention and may be of any known conventional design.

A phonograph driving system 20 is likewise supported by base 10 and includes a motor 17, a drive shaft 18, a coupling device 21, and a friction drive wheel 22. Mechanical driving force provided by motor 17 is transmitted through drive shaft 18 and coupler 21 to friction wheel 22, which is maintained in engagement with the under surface 23 of turntable 11. The structural details of the members comprising driving system 20 are of no particular concern and any well known driving mechanism may be employed so long as it includes provisions for adjusting the rotational speed of turntable 11. Accordingly, this portion of the phonograph has been largely represented schematically in the drawing. One type of driving system which may advantageously be adapted to the invention is disclosed and claimed in the copending application of Ralph A. Mullaney, Serial No. 185,180, filed September 16, 1950, now U. S. Patent No. 2,615,342, issued October 28, 1952, and assigned to the same assignee as the present invention. A link 25 extends from coupler 21 into mechanical engagement with a pin 26 carried by a speed-change lever 27; lever 27 is supported from base 10 by some suitable means such as the pivot pin 28 and projects to the external part of the phonograph cabinet to be available to the phonograph operator. The configuration and dimensions of the free end of lever 27 are primarily a matter of design choice and have therefore not been shown.

Because those portions of the phonograph described thus far are well known in the art, a detailed discussion of their operation is deemed unnecessary. Briefly, turntable 11 supports a record disc in a position where it may be contacted by a phonograph tone-arm; the tone-arm and disc may be of any suitable type and have therefore been omitted from the drawing. Rotation of turntable 11 is effected through the driving connection established between surface 23 and motor 17 through shaft 18, coupling 21 and friction wheel 22. Adjustment of the rotational speed of turntable 11 is accomplished by movement of speed change lever 27, which motion is transmitted to coupling device 21 through the mechanical connection provided by link 25 and pin 26, altering the position of friction wheel 22 with respect to axis 13 of turntable 11.

In the embodiment of the invention shown in Figure 1, a flange member 31 is fixed to surface 23 of turntable 11, here being shown as an integral part of the turntable. A disc 33 is mounted adjacent flange 31, being supported for rotation about a reference axis 34 by means of an axle pin 35. Support for pin 35 and disc 33 is provided by a bracket 36 mounted on base 10 by suitable means such as the rivets 37. A series of gear teeth 38 are formed in the upper peripheral portion of the disc; teeth 38 mesh with a corresponding series of gear teeth 39 formed in flange 31. The lower portion of disc 33 comprises a projecting flange section 41 in which a plurality of series of light-translating areas 40 are provided, the precise arrangement of these areas being more completely illustrated in the bottom plan view of Figure 2; each of the elemental light-translating areas 40, in this embodiment of the invention, comprises an aperture or transparent section in the flange.

As shown in Figure 2, transparent areas 40 are disposed in three separate series 42, 43 and 44 arranged in concentric annular patterns about reference axis 34. Each of these groups of apertures corresponds to one of the three standard recording speeds of 33⅓, 45, and 78 R. P. M.; the relationship between the three groups 42–44 and the speeds to which they correspond is more completely set forth hereinafter. A supporting carriage 46 is mounted directly beneath flange 41 and comprises a lever pivotally fixed to base 10 by a pin 47 at one end, the opposite end being attached to a spring 48 also anchored to base 10. Three cam surfaces 52, 53 and 54 are formed on one surface of the lever and are selectively engaged by a cam pin 51 mounted on speed change lever 27. The pivotal connection of lever 46 to base 10 permits lateral movement thereof over an operating range indicated by dash outlines 56, 57.

A light source 58 is mounted on the uppermost surface of lever 46 directly beneath the apertured portion of flange 41. Light source 58 may be of any type which operates in intermittent fashion at a fixed rate; one satisfactory light source is a small neon bulb, which, when connected to a source of 60 cycle alternating current, provides light flashes occurring at a rate of 120 times per second or 7200 times per minute. The rate at which the light flashes occur should be approximately equal to an integral multiple of the angular velocity of the turntable, as will be made more apparent in the description of the operation of the stroboscope set forth hereinafter. A screen member 61 is associated with light source 58 and restricts illumination therefrom to one of the three aperture groups 42–44. A lens 62, mounted above flange 41, constitutes optical means for directing light received from the illuminating source.

When the phonograph is placed in operation, motor 17 is energized and turntable 11 is rotated by the mechanical force transmitted thereto by driving system 20. Assuming that operation at 45 R. P. M. is desired, speed-change lever 27 is moved to the appropriate position, this movement adjusting drive system 20 so that rotation of the turntable approaches the desired speed. Concurrently, pin 51 engages cam surface 53 and moves carriage lever 46 to the position shown in Figure 2, in which light source 58 is supported directly beneath a portion of aperture group 44. Lever 46 is maintained in this position by the biasing action of spring 48, which prevents undesirable overtravel. Since gear teeth 38 of disc 33 are in mesh with teeth 39 of turntable 11, the disc rotates about axis 34 at a speed directly proportional to the angular velocity of the turntable and therefore directly proportional to the rotational speed of friction wheel 22 of driving system 20. The number and angular spacing of the elemental transparent areas 40 comprising series 44 are selected so that when the speed of turntable 11 is precisely 45 R. P. M. a view taken from an observational vantage point C above lens 62 shows only a single immobile pattern of luminous dots, with no variation or occlusions. The number of apertures required for each of the groups 42–44 is determined in accordance with the following formula:

$$\text{Number of areas} = \frac{\text{light flashes/minute}}{\text{R. P. M.} \times \text{speed ratio}}$$

For 45 R. P. M. this is reduced to the following terms:

$$\text{Number of areas} = \frac{7200}{45 \times 4} = 40$$

These figures are based on the presumption that light source 58 flashes on and off at a rate of 7200 times per minute and that the speed ratio between turntable 11 and disc member 33 is 4:1. In order to achieve precise indication of an exact standard speed, it is necessary that the recurrence rate of intermittent illumination be approximately equal to an integral multiple of the standard speed so that the calculated number of apertures in each group is an integral number.

As indicated above, normal adjustment of speed-change lever 27 results in approximately the correct speed, and there may be some deviation from the desired standard. If such is the case, the image at point C is a series of luminescent dots moving across lens 62. Speed-change lever 27 is then adjusted until the light image is immobilized, at which time the turntable is rotating at precisely 45 R. P. M. It is, of course, desirable that apertures 40 be substantially equal in size and that the spacing between them likewise be essentially equal, since dimensional variations in the apertures themselves and in their spacing within the series may produce image distortions and make it more difficult to determine just when exactly 45 R. P. M. has been reached.

Operation of the phonograph and the stroboscope at either 78 or 33⅓ R. P. M. is analogous to that just described in conjunction with 45 R. P. M. For rotation at 78 R. P. M., lever 27 is moved in the direction of arrow B of Figure 2, which changes the phonograph speed and repositions light source 58 under aperture group 42, as shown by dash outline 57. Similarly, shifting lever 27 in the direction of arrow A conditions the phonograph apparatus and the stroboscope for operation at 33⅓ R. P. M., as indicated by dash outline 56. In each case, adjustment of speed-change lever 27 until the light image at point C ceases movement causes turntable 11 to rotate at the precise desired standard speed. It should be noted that aperture series 42, normally used in conjunction with a speed of 33⅓ R. P. M., also provides an exact reference for rotation at 16⅔ R. P. M., inasmuch as it is exactly equal to one-half of that standard speed.

As will be apparent to those versed in the art, all of the component parts of the speed indicator described herein are relatively simple in form and may therefore be easily and economically manufactured. The entire structure comprises parts which may be made of rugged and durable materials and will last throughout the normal life of the phonograph. The complete stroboscope is included within the phonograph cabinet, with all rotating parts shielded so that they do not endanger the operator, and adjustment is accomplished by means of the standard phonograph speed control apparatus.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a phonograph comprising a record-supporting turntable of predetermined diameter mounted for rotation about a predetermined axis, a driving system for rotating said turntable, and a speed control means for adjusting the rotational speed of said turntable, a speed indicator comprising: a speed indicator disc including a plurality of series of elemental substantially light-transparent areas with the areas of each series equally spaced in an annular pattern about the periphery of said disc and each such series corresponding to a predetermined standard rotational speed; means for supporting said speed indicator disc for rotational movement about a separate reference axis with a substantial part of said disc extending beyond said turntable; mechanical coupling means for maintaining said speed indicator disc in mechanical engagement with said driving system at all times when said phonograph is in operation to rotate said disc about said reference axis at an angular velocity directly proportional to the angular speed of said turntable; and a source of intermittent light having a fixed frequency substantially equal to an integral multiple of each of said standard rotational speeds, said light source being mounted beneath said disc for projecting light through at least a portion of said light-transparent areas in said extended part of said disc for direct view from an observational vantage point.

2. In a phonograph comprising a record-supporting turntable of predetermined diameter mounted for rotation about a predetermined axis, a driving system for rotating said turntable, and a speed control means for adjusting the rotational speed of said turntable, a speed indicator comprising: a speed indicator disc including a plurality of series of elemental substantially light-transparent areas with the areas of each series equally spaced in an annular pattern about the periphery of said disc and each such series corresponding to a predetermined standard rotational speed; means for supporting said speed indicator disc for rotational movement about a separate reference axis with a substantial part of said disc extending beyond said turntable; mechanical coupling means for maintaining said speed indicator disc in mechanical engagement with said driving system at all times when said phonograph is in operation to rotate said disc about said reference axis at an angular velocity directly proportional to the angular speed of said turntable; a source of intermittent light having a fixed frequency substantially equal to an integral multiple of each of said standard rotational speeds, said light source being mounted beneath said disc for projecting light through at least a portion of said light-transparent areas in said extended part of said disc for direct view from an observational vantage point; and a selectively movable screen member to restrict effective illumination from said light source to a portion of a single one of said series of light-translating areas, said screen member being mechanically connected to said speed control means of said phonograph to effect adjustment of said screen member in accordance with changes in the rotational speed of said turntable.

3. In a phonograph comprising a record-supporting turntable a predetermined diameter mounted for rotation about a predetermined axis, a driving system for rotating said turntable, and a speed control means for adjusting the rotational speed of said turntable, a speed indicator comprising: a speed indicator disc including a plurality of series of elemental substantially light-transparent areas with the areas of each series equally spaced in an annular pattern about the periphery of said disc and each such series corresponding to a predetermined standard rotational speed; means for supporting said speed indicator disc for rotational movement about a separate reference axis with a substantial part of said disc extending beyond said turntable, mechanical coupling means for maintaining said speed indicator disc in mechanical engagement with said driving system at all times when said phonograph is in operation to rotate said disc about said reference axis at an angular velocity directly proportional to the angular speed of said turntable; a source of intermittent light having a fixed frequency substantially equal to an integral multiple of each of said standard rotational speeds, said light source being mounted beneath said disc for projecting light through at least a portion of said light-transparent areas in said extended part of said disc for direct view from an observational vantage point; and a movable carriage for selectively supporting said light source in a position where illumination from said source is restricted to a single one of said series of light-transparent areas.

References Cited in the file of this patent

UNITED STATES PATENTS

| | | |
|---|---|---|
| 1,454,713 | Elverson | May 8, 1923 |
| 1,781,866 | Bahney | Nov. 18, 1930 |
| 1,933,305 | Belt | Oct. 31, 1933 |
| 2,273,121 | List | Feb. 17, 1942 |
| 2,667,812 | Miller | Feb. 2, 1954 |